United States Patent [19]
Kindell et al.

[11] 3,730,425
[45] May 1, 1973

[54] BINARY TWO'S COMPLEMENT MULTIPLIER PROCESSING TWO MULTIPLIER BITS PER CYCLE

[75] Inventors: Jerry L. Kindell, Phoenix; Leonard G. Trubisky, Scottsdale, both of , Ariz.

[73] Assignee: Honeywell Information Systems Inc., Waltham, Mass.

[22] Filed: May 3, 1971

[21] Appl. No.: 139,487

[52] U.S. Cl. ....................235/164
[51] Int. Cl. ....................G06f 7/52
[58] Field of Search ....................235/164

[56] References Cited

UNITED STATES PATENTS

| | | | |
|---|---|---|---|
| 3,489,888 | 1/1970 | Wilhelm, Jr. et al. | 235/164 |
| 3,192,367 | 6/1965 | Oman | 235/164 |
| 3,372,269 | 3/1968 | MacSorley et al | 235/164 |

OTHER PUBLICATIONS

Liv & Bee, "Multiplication Using 2's Complement Numbers," IBM Tech. Disclosure Bulletin July 1966 pp. 171–173.

*Primary Examiner*—Eugene G. Botz
*Assistant Examiner*—David H. Malzahn
*Attorney*—Fred Jacob and Edward W. Hughes

[57] ABSTRACT

Multiplication apparatus is described which operates on 2's complement operands by a series of partial product formation cycles and generates the product of the operands in an accumulator register. For each cycle, a pair of the n multiplier bits is processed, right to left. On the basis of each bit pair configuration and the next multiplier bit, the accumulated partial product is shifted 2 bits right and a selected multiple (0, ½ or 1) of the multiplicand is added to or subtracted from the partial product accumulator register. Special initialization logic is restricted to loading the multiplier into an operand register, shifted one bit to the left, with a zero fill in the least significant bit position, and no special logic is required for correct termination after $n/2$ cycles, regardless of operand sign combinations.

4 Claims, 3 Drawing Figures

BINARY TWO'S COMPLEMENT MULTIPLIER PROCESSING TWO MULTIPLIER BITS PER CYCLE

BACKGROUND OF THE INVENTION

Multiplication of binary numbers can be performed in a relatively simple manner. The classic approach is to provide an accumulator register which has twice the length n of the operands, because the product can approach twice the size of the operands. The multiplier is conveniently stored in the less significant half of the accumulator register. The more significant half of the accumulator and the contents of a multiplicand register are applied to an adder. The output of the adder is effectively the sum of the accumulated partial products and the potential partial product consisting of one times the multiplicand. A series of n cycles is set up. For each cycle, the least significant bit of the accumulator is examined and the output of the adder is stored in the more significant half of the accumulator or not, in accordance with that bit being a "1" or a "0," respectively. The accumulator is shifted right one bit and the cycle is repeated until the entire multiplier has been examined. As a result, the multiplicand has been multiplied by $2^n$, for every "1" bit in the multiplier and these partial products have been accumulated with the proper alignment due to the cyclic shifts which divides the result by 2 in each cycle. Various techniques exist for handling the different sign combinations of the operands, for the different types of number representations, that is, sign and magnitude, 1's complement and 2's complement. Standard multiplication algorithms are described in "Digital Computer Design Fundamentals" by Yaohan Chu, McGraw-Hill 1962, pages 24–35.

For 36 bit operands, this process calls for 36 cycles including an adder operation for each "1" in the multiplier, which requires time for carry propagation through the adder for each adder operation. One approach to speeding up multiplication is to examine multiplier bits in pairs and add or subtract multiples of the multiplicand to the accumulator. Examples of this type of multiplication are described in "The Logic of Computer Arithmetic" by Ivan Flores, Prentice-Hall, Inc., 1963, pages 164–174. With this implementation, a configuration of "11" is treated as calling for a subtraction of the multiplicand and a carry-out, which is stored, and effectively causes the addition of four times the multiplicand during the next cycle. A modification of this algorithm is described in the *Proceedings of the IRE*, Jan., 1961, pages 73–75 in "High-Speed Arithmetic in Binary Computers," by O. L. MacSorley.

In this algorithm, the following decision table is set forth:

| Multiplier Bits | Multiplicand multiple used |
|---|---|
| 0 00 | 0 |
| 0 01 | +2 |
| 0 10 | +2 |
| 0 11 | +4 |
| 1 00 | −4 |
| 1 01 | −2 |
| 1 10 | −2 |
| 1 11 | 0 |

One aspect of the algorithm is that upon examining each bit pair, from right to left, it is assumed that for odd values, the prior cycle has made the accumulated partial product too low by one times the multiplicand. Furthermore, if the next pair is odd, it supplies a partial product which will make the accumulated partial product for the next cycle too low by one times the multiplicand. However, for the first cycle, a one in the least significant bit position requires special treatment. MacSorley teaches the use of an extra cycle, that is, adding a pair of dummy 0 bits to the multiplier or the modification of the first cycle to provide a subtraction of the multiplicand if the least significant bit is a 1.

Also, for practical applications, the requirement that multiplicand multiples of 2 and 4 be handled is a practical problem in that two paths to the adder must be implemented in addition to the basic path for the straight addition type operations. Furthermore, the logic must ensure correct results for all combinations of signs for the multiplicand and multiplier.

Accordingly, it is an object of the invention to provide 2's complement multiplication apparatus having n bit multipliers which requires only $n/2$ cycles.

It is a further object of the invention to provide such multiplication apparatus having a minimum of special hardware, including only one extra set of connections to the adder for the multiplicand.

It is a further object of the invention to provide such apparatus which requires a minimum of hardware and execution time to insure a proper termination for all combinations of operand signs.

SUMMARY OF THE INVENTION

Apparatus is provided which performs multiplication in the following manner. The multiplier is loaded into a multiplier register multiplied by two before multiplication commences. That is, the multiplier is stored shifted left 1 bit, with a zero fill in the least significant bit position. A standard cycle is adopted as follows. The accumulated partial product is shifted right two bits, that is, divided by four. Then multiplicand factors are selected in accordance with the following table:

| Multiplier Bits | Multiplicand factor |
|---|---|
| 0 00 | 0 |
| 0 01 | ½ |
| 0 10 | ½ |
| 0 11 | 1 |
| 1 00 | −1 |
| 1 01 | −½ |
| 1 10 | −½ |
| 1 11 | 0 |

When the multiplier bit pair is reached which has the sign bit as the bit in the next bit pair to be examined, the standard table is followed and the multiplication cycles terminated. That is, the sign bit enters execution as controlling the operation for the two adjacent multiplier bits, but is ignored otherwise, resulting in exactly $n/2$ cycles.

A SPECIFIC EMBODIMENT OF THE INVENTION

Figure 1:
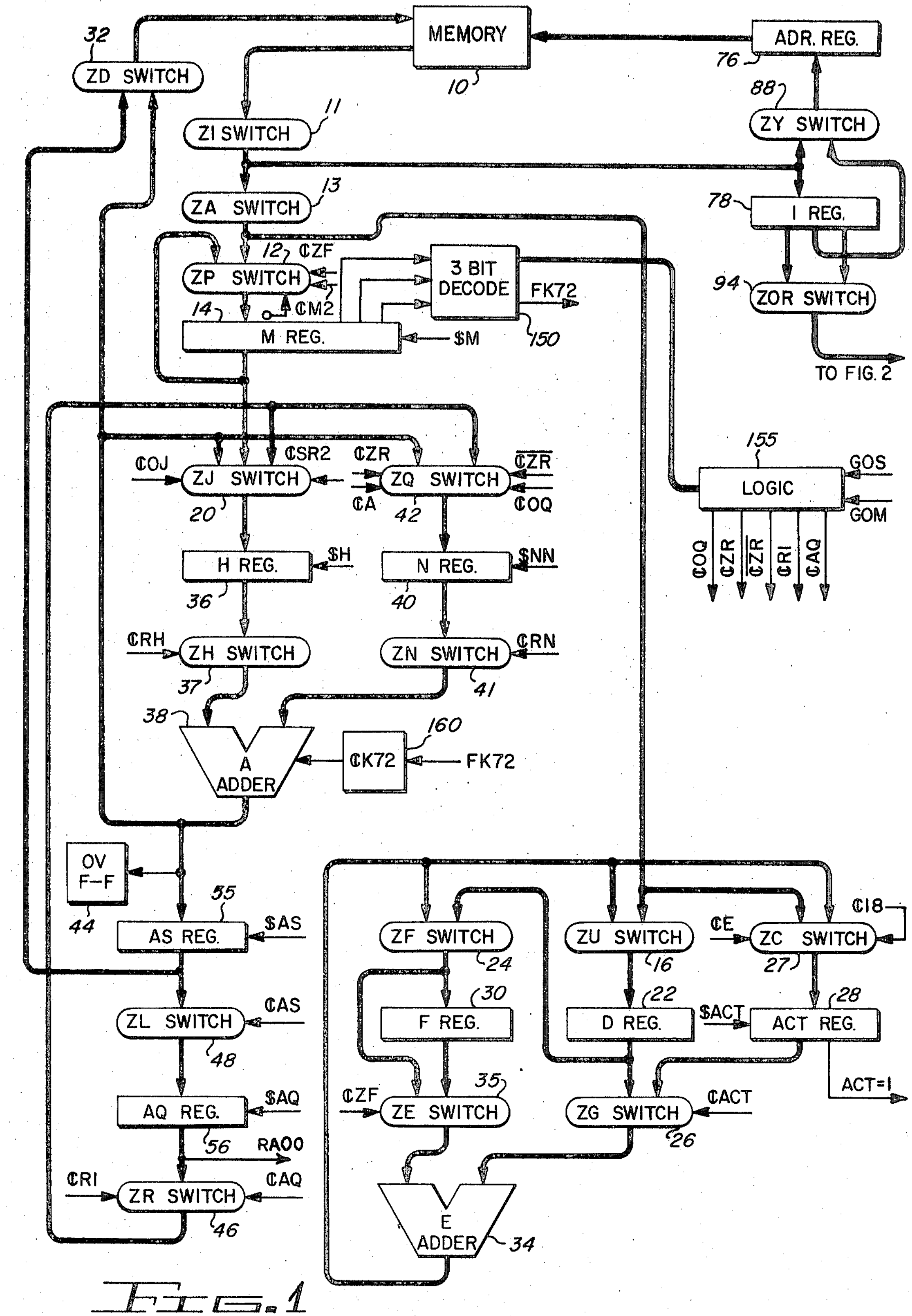
FIG. 1 is a block diagram of a preferred embodiment of the invention, illustrating registers, switches and adders constituting an operations unit for a binary, 2's complement, digital computer.

FIG. 1 illustrates the major components required for the arithmetic unit and interconnections for implementing the present invention in a preferred embodiment. For a more complete description of the data processing system, reference is made to U.S. Pat. No. 3,413,613, "Reconfigurable Data Processing System," D. L. Bahrs et al., issued Nov. 26, 1968.

A main memory 10 directs instruction words through ZI switch 11 to ZY switch 88 and instruction I register 78, and directs data words through ZA switch 13. A pair of data words are gated by the ZA switch 13 and ZP switch 12 to a 72 bit M register 14, which holds the multiplier operand. ZJ switch 20 selectively connects data words from the M register to a 72 bit H register 36, one of the pair of operand registers for the main A adder 38. This data path is used for various operations such as the load instruction. The second operand register is a 72 bit N register 40 which is loaded from ZQ switch 42. The A adder is a 72 bit adder which selectively performs the arithmetic operations of addition and subtraction for 2's complement numbers and the logical operations of OR, AND, and exclusive OR. The inputs to the A adder are selected by ZH gate 37, having as one first operand input the H register 36, and by ZN gate 41, having as one second operand input the N register 40. For multiplication, the H register serves as a partial product accumulator and the N register holds the partial product formed by the selected multiplicand factor. The output of the A adder is stored in a 72 bit AS register 55 or can be selectively gated to the H register by ZJ switch 20 and to the N register by ZQ switch 42. The contents of the AS register are selectively gated for storage in memory or to a 72 bit general accumulator, AQ register 56, by ZD switch 32 and ZL switch 48, respectively. Through ZR switch 46, the general accumulator contents are selectively gated to the H or N registers by ZJ switch 20 and ZQ switch 42.

Exponent portions of words from the memory 10 which pass through Z1 switch 11 are also selectively gated, right justified, to a 10 bit D register 22 by ZU switch 16, for the purpose of separating an exponent from a floating point number, or gated to a 10 bit ACT register 28 by ZC switch 27, for the purpose of maintaining shift counts and the like. An exponent E adder 34 is provided for performing exponent processing and auxiliary functions. Inputs to the exponent adder are taken from ZE switch 35 and ZG switch 26. The output of the exponent adder is connected to ZF switch 24, ZU switch 16, and ZC switch 27. The ZF switch gates operands from the D register and exponent adder outputs to an F register 30.

Figure 3:
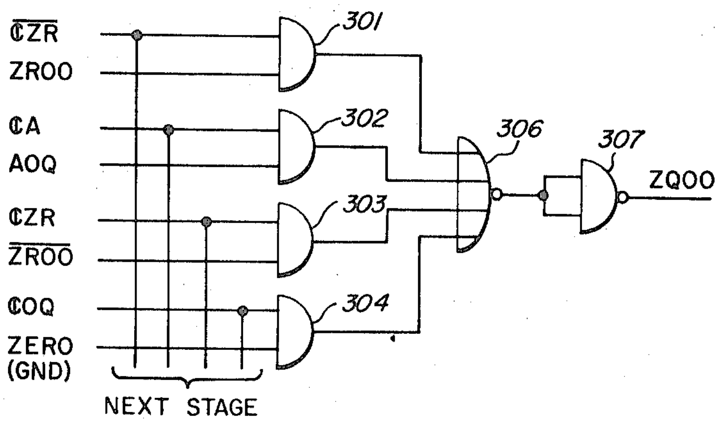
FIG. 3 is logic diagram of an implementation of a representative switch for the FIG. 1 operations unit.

The apparatus shown in FIG. 1 consists of a combination of switches, registers and adders. The particular implementation of these devices is not material to the present invention. To implement the A adder 38 it is sufficient to use 72 full adders, each adder having as inputs a bit from the corresponding bit position in each operand applied thereto and a carry-in from the next less significant full adder. The least significant full adder is adapted to receive a 1 or a 0 as a carry-in in accordance with the gating signals. The sum outputs of the full adders serve as adder outputs for the respective bit positions and the carry-out outputs of the full adders provide carry-in inputs for the next most significant full adder. The most significant full adder's carry-out output is connected to an adder carry-out flip-flop. Also, logic is included to detect overflow which sets OV flip-flop 44. In practice, the simple adder as just described is preferably modified to reduce carry propagation time by carry-look-ahead logic, conditional sum logic, etc., in accordance with the desired processor performance. The registers are conveniently DC flip-flops gated by control signals. The switches are comprised of a set of parallel logic gate stages such as the first stage of ZQ switch 42 shown in FIG. 3. For the selectable inputs, AND gates 301, 302, 303, 304 are provided for the inputs from the A Adder 38, ZR switch 46 true and 1's complement and a permanent zero, respectively. These inputs are gated by applying the respective control signals ¢A, ¢ZR, ¢$\overline{ZR}$, and ¢OQ. The outputs of these AND gates are ORed together by NOR gate 306, the output of which is inverted by NAND gate 307.

Figure 2:
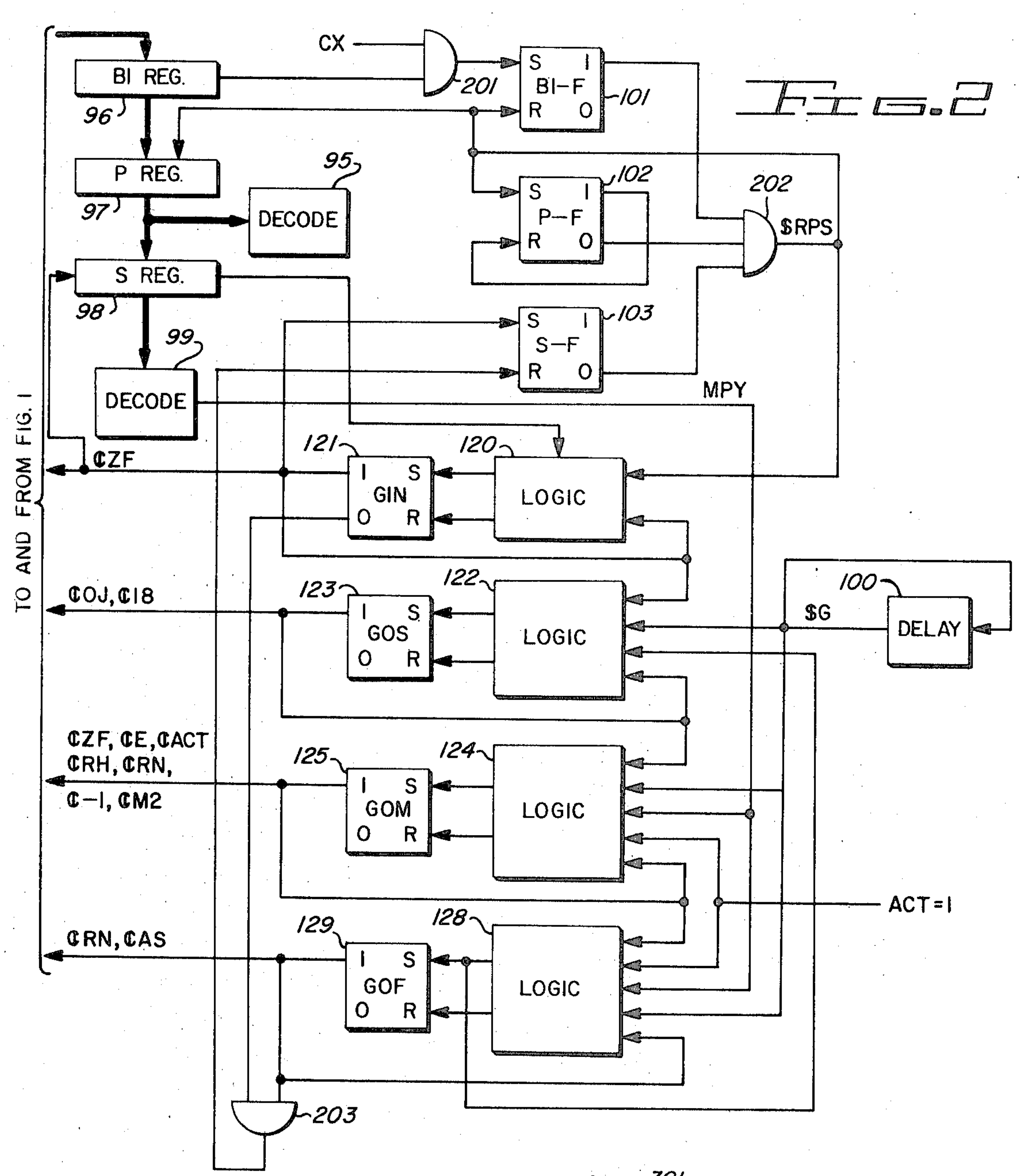
FIG. 2 is a block diagram of logic elements constituting a control unit for the operations unit of FIG. 1.

FIG. 2 includes the major components providing a control unit which decodes operation codes, initiates and terminates machine cycles, and generates various control signals. From the instruction I register 78 of FIG. 1, the operation code portions of the instructions, namely bits 18–26 or 54–62, are selectively switched into a buffer B1 register 96 by ZOR switch 94. The B1 register provides an input to a P register 97 which in turn provides an input to S register 98 and decode network 95. The decode network controls the loading of the multiplier operand into the M register 14. The B1 register also generates a signal B1–FULL, indicating it has been loaded from the I register, which sets a B1 flag flip-flop 101, when clocked by a CX clock in AND-gate 201. This flip-flop in turn sets a P flag flip-flop 102, which resets the B1 flag flip-flop and initiates a preliminary operation cycle *GIN* by setting a *GIN* RS flip-flop 121, during which the instruction set up occurs and the contents of the B1 register are transferred to the P register. The setting of the *GIN* flip-flop 121 causes the contents of the P register to be transferred to the S register, which in turn causes the S flag flip-flop 103 to be set and provides the input to operation decode network 99.

In general, machine operating cycles are delimited by a $G clock signal from a clock generator 100. This generator incorporates a feedback path and a delay element, such as a shift register. With the provision of variable delay, the duration of each machine cycle can be set to the minimum necessary for the type of cycle being performed to provide maximized instruction execution efficiency.

During the machine cycle with GOS on, the multiplicand operand is shifted from the accumulator AQ register to the operand N register. The control signal for this cycle is provided by the *GOS* RS flip-flop 123 being in the set state. The logic 122 controls the *GOS* flip-flop as follows:

$$\text{set } GOS = \$G\,hu\,.\,GIN\cdot\overline{\text{set } GOF}$$

$$\text{reset } GOS = \$G\cdot GOS$$

After the N register operand is set up, the partial product accumulation is performed during the *GOM* cycles. The control signal for this cycle is provided by the *GOM RS* flip-flop 125 which is controlled by logic 124 as follows:

$$\text{set } GOM = \$G \cdot GOS \cdot MPY$$

$$\text{reset } GOM = \$G \cdot GOM \cdot MPY \cdot (ACT = 1)$$

The *MPY* signal is provided by the *OP* code decode network 99.

During the last machine cycle of instruction execution, GOF, the rounded operand is returned to the AQ register. The control signal for this cycle is provided by the *GOF* RS flip-flop 129 being in the set state. The logic 128 controls the *GOF* flip-flop as follows:

$$\text{set } GOF = \$G \cdot (GOM \cdot MPY \cdot (ACT = 1))$$

$$\text{reset } GOF = \$G \cdot \overline{(GOM \cdot MPY \cdot (ACT = 1))}$$

In the drawings, control signals for the registers are shown with a "$" prefix and the remaining control signals are shown with a " ¢ " prefix. The sources of the second type signal are shown explicitly in connection with the respective cycles, *GIN*, *GOS*, *GOM* and *GOF*. The control signals for gating the registers are also generated during these cycles, but their leading edge is delayed until near the end of the cycles by ANDing them with the $G clock signal. This allows time for carrying propagation, line settling, etc. The register control signals merely latch the registers in accordance with the generated input signals.

Execution of the instruction fractional multiply proceeds in the following manner, through the four successive stage *GIN*, *GOS*, *GOM* and *GOF*, which are enabled by the respective flip-flops in the control logic of FIG. 2. With *GIN* on, the multiplier operand fetch is completed, control signal ¢ ZF gating the operand through ZP switch 20 into M register 14, which is gated by the $M signals. The operand is a 36 bit 2's complement number and is stored in bit positions 35–70 in the M register. The least significant bit of the M register, position 71, is loaded with a zero by ZP switch 12, when the multiplier is gated in by the control signal ¢ ZF.

With *GOS* on, the H register 36, which serves to accumulate the partial products, is cleared by the control signal ¢ OJ being applied to the ZJ switch 20. At the same time, the ACT register 20 is initialized with a count of 18 by the control signal ¢ 18 being applied to the ZC switch 18 when the $ACT signal is applied to the ACT register. Also, the appropriate multiplicand factor is loaded into the N register by applying the appropriate control signal ¢ OQ, ¢ ZR, or ¢ $\overline{\text{ZR}}$ to the ZQ switch 42 and gating the N register with the $NN signal. The multiplicand is taken as is from the AQ register 56 through ZR switch 46 by applying control signal ¢ AQ or is shifted right 1 bit by applying control signal ¢ R1. In the latter case, the sign bit of the multiplicand is also switched to the most significant bit position on the bus out, thereby providing a sign smear.

After the operand initialization cycle, 18 multiplication cycles are performed, with GOM on, which are identical except for the last cycle as noted below. During each cycle, the A adder generates the sum of the accumulated partial products from the H register and the multiplicand factor from the N register, in response to the control signals ¢ RH and ¢ RN being applied to the ZH switch and ZN switch, respectively. This sum is then stored in the H register, shifted right two bit positions, in response to the control signals ¢ SR2 applied to the ZJ switch and $H applied to the H register. The sign is selected for the accumulated partial product in accordance with the exclusive OR of the sign bit output of the A adder and the overflow flip-flop. The resulting sign is smeared into the adjacent bit position in the ZJ switch. At the same time, the multiplier in the M register is shifted right 2 bit positions in response to the control signals ¢ M2 and $M being applied to the ZP switch and the M register. Also at the same time, the E adder decrements the ACT register by one by application of control signals ¢ −1 to the ZF switch, ¢ ZF to the ZE switch, ¢ ACT to the ZG switch, ¢ E to the ZF switch, and $ACT to the ACT register.

For the last of the 18 cycles, when the contents of the ACT register are equal to one, the *GOM* cycle is simplified. The partial product accumulation from the output of the A adder is stored in the N register unshifted. Accordingly, the control signal ¢ A is applied to the ZQ switch. Shifting of the M register is dispensed with, but the ACT register is decremented in the same manner.

Termination of the multiplication operation is done with GOF on, which consists of merely transferring the accumulated partial product to the general accumulator AQ register 56. The control signals ¢ RN, $AS, ¢ AS, and $AQ cause the contents of the RN register to be transferred through the ZN switch, the A adder, the AS register, the ZL switch, and into the AQ register. Because no control signal is applied to the ZH switch, the A adder output is the sum of zero and the final product from the N register.

The multiplicand factor is selected in accordance with the last three bits in the multiplier M register and the decision table given in the Summary of the Invention. The three least significant bits of the M register 14 provide the input to the logic 150 that determines the multiplicand factors 0, ±½, ±1. These factors are conveniently a sign signal and two signals selecting the magnitude of the multiplicand factor. Logic 155 generates the control signals ¢ OQ, ¢ ZR, ¢ $\overline{\text{ZR}}$, ¢ R1, ¢ AQ, as described above, in response to multiplicand factor signals from logic 150 and the *GOS* and *GOM* signals from FIG. 2.

Conceptually, the basic multiplication cycle consists of (1) selection of the multiplicand factor in accordance with the three least significant multiplier bits and an arithmetic right shift of the accumulated partial product by two bit positions; then (2) addition of the multiplicand factor to the accumulated partial product and a 2 bit shift right of the multiplier. One way in which this cycle differs from a standard multiplication cycle is that the shift occurs before the addition. This difference is not apparent from the foregoing material because the first shift is not explicitly implemented. The initial accumulated partial product is zero so that it is not necessary to physically shift the H register. The steps (1) and (2) are then combined so that the accumulated partial products are stored shifted right 2 bits, anticipating the next cycle, except for the last cycle. Also, the selection of the multiplicand factor and the shift of the multiplier is performed at the same time. If the shift were performed after the addition, two special paths, for twice and four times the multiplicand, would have to be implemented.

For the fraction data type, the desired result for *n* bit operands is a $2n-1$ bit product, that is, a sign bit and twice the fraction. In the described embodiment, the 36 bit multiplier is initially doubled, forming a 37 bit operand. Because there are 18 cycles, the sign bit accordingly is not directly used as a multiplier bit. Its only affect is to cause the multiplicand factor to be selected as positive or negative during the last cycle. If the conventional fractional multiply operation is considered as a conventional integer multiply operation modified by a termination adjustment of a left shift of one, the initial modification of the multiplier in the disclosed embodiment can be considered an anticipatory left shift of the product by one.

If the multiplication operation is considered on an integer basis, the multiplier and multiplicand operands can be considered as expanded to a binary number, modulo $2^{2n}$, because the product is modulus $2^{2n}$. One can consider the sign bit as smeared left $n$ bits. Then the desired product of two positive numbers can be considered as the elementary accumulation of partial products in accordance with the positions of "1" bits in the multiplier. As this process is described in the Background of the Invention, the sign smear can be considered to be implicitly implemented by the shift step, one bit at a time. For a negative multiplicand, the same process takes place, with the sign smeared being a one and the accumulated partial products being effectively limited to the modulo $2^{2n}$. For negative multipliers, the desired results can be obtained by multiplying the operands as if they were positive numbers, modulo $2^{2n}$. To perform $2n$ cycles for $n$ bit operands is not practical and is unnecessary. When the multiplier is examined right to left and the $n$th bit is reached, processing can be terminated. For a positive multiplier, the smeared bits are all zeros so that the product would be unchanged by further cycles. If the multiplier is negative, the smeared sign bits are all ones, so that subtracting the partial product and terminating is equivalent to proceeding with all ones.

In the disclosed embodiment, for negative multipliers, the last cycle causes the multiplicand factor to be subtracted in such a manner that the same result is obtained as would be obtained for an additional multiplication cycle on the $n+1$th bit which caused the multiplicand to be subtracted. Thus it has been found that modification of the multiplier operand at the start of the multiplication operation mates with the sign combination considerations to minimize control logic and processor operations.

The invention is also applicable to processing multiplier bits three at a time. The decision table is as follows:

| Multiplier bits | Multiplicand factor |
|---|---|
| 0 000 | 0 |
| 0 001 | ¼ |
| 0 010 | ¼ |
| 0 011 | ½ |
| 0 100 | ½ |
| 0 101 | ¾ |
| 0 110 | ¾ |
| 0 111 | 1 |
| 1 000 | −1 |
| 1 001 | −¾ |
| 1 010 | −¾ |
| 1 011 | −½ |
| 1 100 | −½ |
| 1 101 | −¼ |
| 1 110 | −¼ |
| 1 111 | 0 |

However, the factors ¾ and −¾ require the initial formation of a "triple," that is, three times the multiplicand and a register must be provided to store the triple. Also, additional switches and logic must be provided to implement the functions required for the decision table.

It is further noted that the fractional multiply operation described is converted to an integer multiply operation merely by incorporating an arithmetic right shift of one for the result stored in the general accumulator AQ register during the termination of the operation. Also, the fractional multiply operation is directly applicable to multiplying the fraction portions of floating point numbers.

The invention can be implemented by modifying the conventional processing structure described in the Background of the Invention, using the general accumulator register to serve as both a partial product accumulator and a multiplier register. However, such an approach results in greater complications when it is desired to also support floating point operations having operands with fractions longer than half the general accumulator.

While a particular embodiment of the invention has been shown and described herein, it is not intended that the invention be limited to such disclosure, but that the invention is generally applicable to digital computers which perform multiplication by processing a plurality of multiplier bits at a time. For example, in the embodiment described, pairs of multiplier bits are processed right to left but the order of processing the pairs is not essential. They may be processed in any order or in parallel if desired, but such modifications tend to increase the cost of the processing apparatus.

What is claimed is:

1. In a binary computer, apparatus for performing multiplication comprising:

A. an adder for generating the algebraic binary sum of first and second input operands;

B. accumulator means connected to said adder for storing said adder output and for providing said first adder input operand;

C. multiplicand means including switching means for selecting multiples of the multiplicand connected to said adder for providing said second adder input operand;

D. multiplier means for storing an m bit multiplier factor;

E. logic means connected to said multiplier means and said multiplicand switching means and responsive to the state of a plurality $n+1$ of consecutive multiplier bit positions for selecting an algebraic multiple factor of said multiplicand for application to said adder, the multiple factor having the algebraic value of the examined bits modified as follows, the factor sign is negative if the most significant bit is a one and the factor magnitude is increased by one if the least significant bit is a one and the binary point is considered to follow the first examined bit;

F. cycle control means for effecting store of said adder output into said accumulator means and shifting the contents of said multiplier means and said accumulator means by $n$ bit positions;

G. termination means for terminating said cycle control means after $m/n$ cycles.

2. The apparatus of claim 1 further comprising:

H. means to initialize said multiplier means with a zero concatenated to the least significant bit.

3. Multiplication apparatus comprising:

A. an adder for generating partial products in the form of the binary sum of two operands and including a carry-in input;

B. a partial product accumulator register connected to said adder, for storing the accumulated partial products and for providing the first operand input;

C. multiplicand register means for storing a multiplicand and selectively applying a multiple, ½, 1 or 0, thereof as the second operand for said adder;

D. a multiplier register for storing an *m* bit multiplier and having an additional position;

E. initialization means for loading a multiplier into said multiplier register, effectively multiplied by two and right justified;

F. logic means connected to said multiplicand register means and responsive to the two least significant bit positions of said multiplier register and the adjacent bit position for providing a multiplier cycle in accordance with the following rules, 1. subtraction of a multiplicand multiple of zero, half or one for a 1 in said adjacent bit position,
2. select a 0 magnitude multiplicand multiple if all examined bits are the same,
3. select a 1 magnitude multiplicand multiple if the pair of multiplier bits are the same and differ from the adjacent bit position,
4. select a ½ magnitude multiplicand multiple if the pair of multiplier bits differ;

G. cycle control means for producing exactly *m*/2 multiplier cycles, and for each cycle, storing said adder output in said partial product accumulator register having the register's contents shifted right by 2 bit positions except for the last cycle, effecting the add operation, and shifting said multiplier register 2 bit positions to the right.

4. In a binary computer, multiplication apparatus comprising:

A. an adder for producing the binary sum of first and second operands;

B. an accumulator register connected to said adder for storing said adder output and providing said first input operand;

C. a general register for storing a binary multiplicand number;

D. a multiplicand factor register for storing a multiple of said multiplicand number and providing said second operand;

E. multiplicand switching means connecting said general register to said multiplicand factor register for selectively applying either said multiplicand number or the 1's complement thereof and selectively applying a multiple of zero, half or one times said multiplicand number;

F. a multiplier register for storing a binary number having m bits;

G. operand switching means for loading said multiplier register with a number having a zero concatenated as the least significant bit;

H. multiplier shifting means for interconnecting the bit positions for causing the contents of said multiplier register to be shifted right two bit positions;

I. partial product shifting means interconnecting said adder and said accumulator register for arithmetically shifting said adder output two bit positions right;

J. counting means for controlling the number of multiplication cycles, including means for initializing for a count *m*/2;

K. multiplicand factor selection means connected to said multiplicand switching means and responsive to the three least significant bits of said multiplier register for selecting the true form of said multiplicand number or its 1's complement and an adder carry-in in accordance with the most significant of the three bits and for selecting a multiple of said multiplicand in accordance with the two least significant bits, the least significant bit being rounded up if "1," and the result being construed in accordance with the following table:

| Multiplier Bits | Multiplicand Factor |
|---|---|
| 0 00 | 0 |
| 0 01 | ½ |
| 0 10 | ½ |
| 0 11 | 1 |
| 1 00 | −1 |
| 1 01 | −½ |
| 1 10 | −½ |
| 1 11 | 0 |

L. cycle control means responsive to said counting means for cyclically gating said accumulator and multiplicand registers, shifting said multiplier register contents, and decrementing said counting means until a count of zero is reached.

* * * * *